United States Patent [19]

Pelotte

[11] Patent Number: 4,580,261
[45] Date of Patent: Apr. 1, 1986

[54] SYSTEM FOR EXCHANGING ENCODED MESSAGES BETWEEN STATIONS

[75] Inventor: André Pelotte, Lannion, France

[73] Assignee: Compagnie Industrielle des Telecommunications CIT-Alcatel, Paris, France

[21] Appl. No.: 589,449

[22] Filed: Mar. 14, 1984

[30] Foreign Application Priority Data

Mar. 29, 1983 [FR] France .................................. 8305124

[51] Int. Cl.⁴ ........................... H04J 3/16; H04J 3/17; H04J 3/02
[52] U.S. Cl. ...................................... 370/85; 370/79; 370/80
[58] Field of Search ....................... 370/85, 79, 80, 95, 370/82, 83; 340/825.5, 825.51

[56] References Cited

U.S. PATENT DOCUMENTS

| | | | |
|---|---|---|---|
| 3,789,145 | 1/1974 | Shah et al. | 370/85 |
| 3,828,137 | 8/1974 | Monford, Jr. | 370/85 |
| 4,225,919 | 9/1980 | Kyu et al. | 370/83 |
| 4,236,245 | 11/1980 | Freeny et al. | 370/82 |
| 4,301,532 | 11/1981 | Janetzky | 370/85 |
| 4,347,603 | 8/1982 | Jacob et al. | 370/85 |
| 4,373,183 | 2/1983 | Means et al. | 370/85 |
| 4,426,697 | 1/1984 | Petersen et al. | 370/85 |
| 4,451,881 | 4/1984 | Grice et al. | 370/85 |
| 4,463,351 | 7/1984 | Chiarottino | 370/85 |

FOREIGN PATENT DOCUMENTS 022170 1/1981 European Pat. Off. .

OTHER PUBLICATIONS

Proceedings of the IEEE, vol. 65, No. 9, Sep. 1977, pp. 1323–1329.
Proceedings of IFIP Congress, Aug. 8–12, 1977, pp. 431–436.
IEEE International Conference on Communications, Jun. 17–19, 1974, pp. 21F-1 to 10, p. 21F-7. *
Electronics International, vol. 54, No. 12, Jun. 1981, pp. 176–181.
IEEE Computer Society International Conference (COMPCON), Sep. 23–24, 1980, pp. 261–267.
Colloque International De Commutation, May 7–11, 1979, pp. 608–614.

Primary Examiner—Douglas W. Olms
Assistant Examiner—Wellington Chin
Attorney, Agent, or Firm—Sughrue, Mion, Zinn, Macpeak, and Seas

[57] ABSTRACT

In a system for exchanging encoded messages between stations, each station comprises a control unit and a connection module connected to a signaling link and a data link, the signaling and data links being serial multiplex links synchronized by a general timebase. Each connection module sends over the signaling link, in a time slot of a frame, four status bits, one reservation bit and one standby bit and receives in its time slot a calling bit from a calling station, or sends a calling bit in the time slot of a called station. The length of the data messages is equal to an integer number of frames, this number having a predetermined maximum value beyond which a watchdog timer disables sending over the information link. Each message is sent in its entirety and without interruption.

4 Claims, 7 Drawing Figures

SYSTEM FOR EXCHANGING ENCODED MESSAGES BETWEEN STATIONS

BACKGROUND OF THE INVENTION

1. Field of the Invention

The invention concerns the exchange of encoded messages between stations and particularly, but not exclusively, between control units of a time-division exchange.

2. Description of the Prior Art

Systems are already known for exchanging encoded messages between stations operating in time-sharing mode. The stations may comprise computers or data receiving and sending devices or, more generally, data processing devices. In such message exchange systems, a message with priority higher than that of other messages takes precedence over such messages, requiring costly and complex switching arrangements.

One system for exchanging encoded messages between stations is disclosed in French Pat. No. 2 455 838. In a system of this kind each station comprises a connection module connected to a signal bus and to a data bus, which are serial buses synchronized by a timebase common to all the stations, a time interval comprising consecutive even-numbered and odd-numbered time slots being allocated in each signaling frame to each connection module. The signal and data buses operate at 1.28 Mbit/s, the data is exchanged in 32 time slots of a 125 microsecond frame and each time slot is subdivided into five intervals. The message length is fixed and limited to 157 bits. In this system the maximum number of stations interconnected is 15 and the priority of the stations on the data bus is fixed, station number 1 having the maximum priority, which means that at the end of message exchange from a sending station n, at the start of the signal bus frame station 1 is processed first, then station 2 if station 1 is not requesting, and so on until the first station in the requesting condition on the signal bus.

Thus in an exchange system of this kind the number of stations is limited, the messages have a fixed format and a limited length, and the priority of station access to the data bus is fixed.

As a result, an exchange system of this kind features constraints which limit or rule out its utilization.

An object of the invention is therefore a system for exchanging encoded messages between stations which does not have the disadvantages of the known exchange system.

SUMMARY OF THE INVENTION

The present invention consists in a system for exchanging encoded messages between stations connected by a signaling link and a data link, wherein each station is connected to a general timebase and includes a control unit, a connection module connected to the signaling and data links, and an address bus and a data bus connecting the control unit and the connection module, wherein the signaling and data links are serial multiplex links synchronous with the timebase, a time slot in a signaling frame is assigned to each station, and the messages to be transmitted are of different lengths and are contained within an integer number of frames, and wherein the connection module comprises:
means for sending its status in its time slot,
a signaling sender circuit,
a signaling receiver circuit,
a station status memory,
a message receiver circuit,
a message sender circuit,
a message send memory,
a message receive memory,
means for addressing the message send memory,
means for addressing the message receive memory,
an output circuit connected to the data link,
means for producing a signal corresponding to the time slot of a calling station,
means in said addressing means for displaying and decrementing the number of frames in the message to be sent,
means for producing a signal when the number of frames to be sent is zero,
means for producing in its time slot a reservation signal with a duration of one frame,
means for sending a reservation bit over the signaling link in its time slot and according to the reservation signal,
means for producing a signal corresponding to the time slot of a called station,
means for sending a calling bit over the signaling link in the time slot of the called station,
means for producing at the frame end of the reservation signal a send timing pulse signal in order, on the one hand, to activate the means for producing the reservation signal, provided that the number of frames to send is not zero, so as to again send a reservation bit and a calling bit, and, on the other hand, to activate the decrementing means of the addressing means of the message send memory and the message sender circuit, and
means for producing an end of sending timing pulse signal from the send timing pulse signal and for activating, in its time slots, the message sender circuit, in order to send an odd parity bit after the message.

Other objects and advantages will appear from the following description of an example of the invention, when considered in connection with the accompanying drawings, and the novel features will be particularly pointed out in the appended claims.

DESCRIPTION OF THE PREFERRED EMBODIMENT

Figure 1:
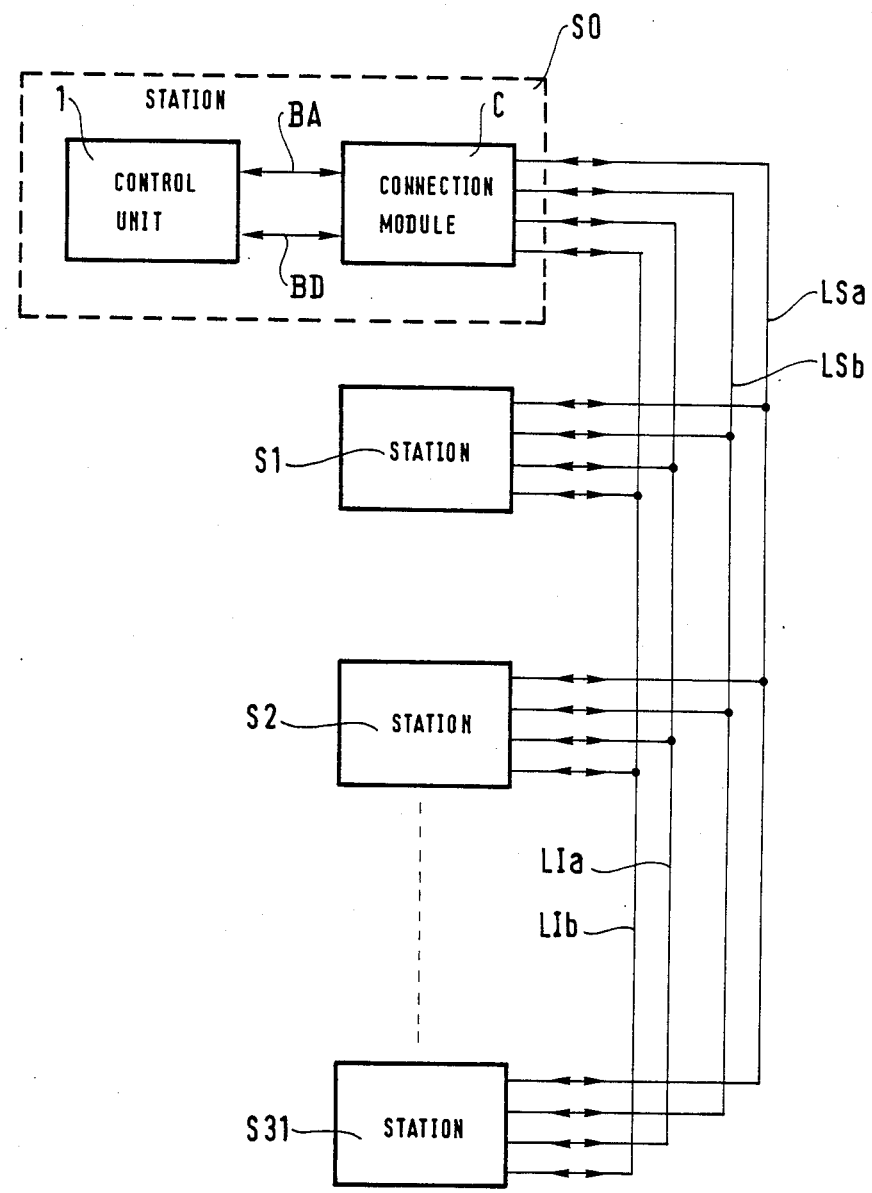
FIG. 1 is a block schematic diagram of a system in accordance with the invention.

FIG. 1 is a block schematic diagram of a system in accordance with the invention. In this diagram, S0, S1, S2, ..., S31 are stations interconnected by an exchange bus consisting of a two-way signaling link and a two-way data link. For reasons of security, there are two signaling links LSa and LSb and two data links LIa and LIb.

Each station comprises a control unit 1 and a connection module C constituting an interface between the control unit and the signaling and data links. A two-way address bus BA and a two-way data bus BD interconnect the control unit and the connection module.

Figure 2:
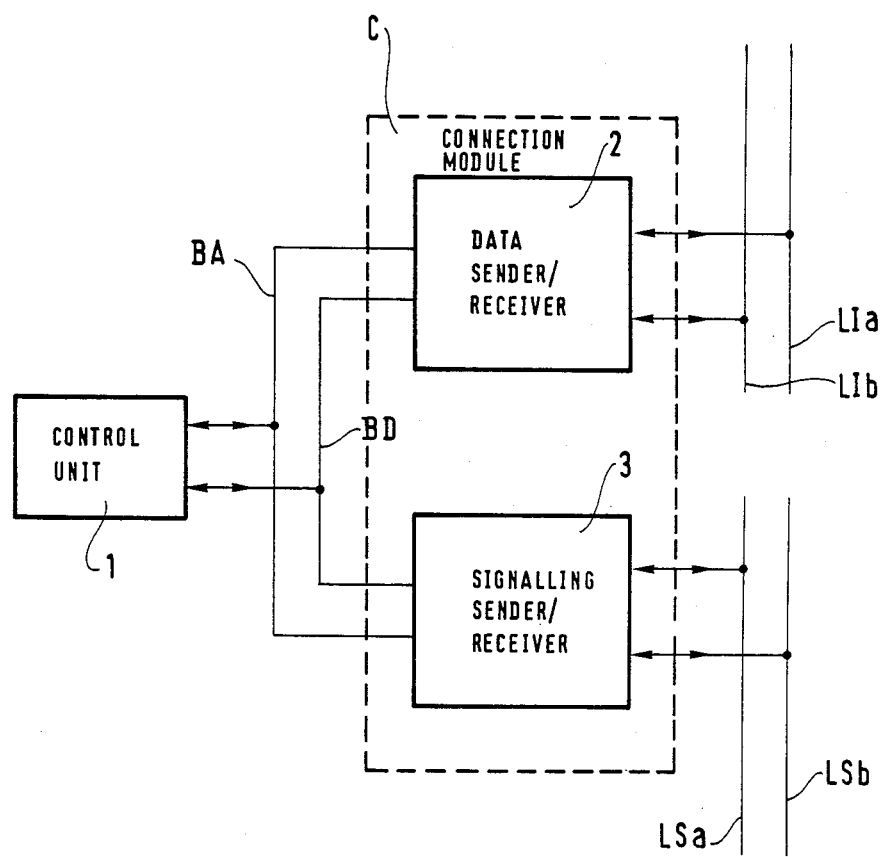
FIG. 2 is a block schematic diagram of one station from FIG. 1.

FIG. 2 is a block schematic diagram of one station from FIG. 1, all the stations being identical and connected to a general timebase (not shown).

A station comprises the control unit 1 implementing the function of the station and the connection module C consisting of a data sender-receiver module 2 connected to the two data links LIa and LIb and a signaling sender-receiver module 3 connected to the two signaling links LSa and LSb. Each signaling sender-receiver module comprises a signaling sender and a signaling receiver respectively shown in FIGS. 3 and 4. Each data sender-receiver module comprises a data sender and a data receiver respectively shown in FIGS. 6 and 5.

The system in accordance with the invention provides for interconnecting 32 stations by means of the exchange bus consisting of a serial data link and a serial signaling link synchronized by a clock signal W. Exchanges are timed by signal W (2.048 Mbit/s) with the least significant bit of each word sent first. Each station has its own exchange bus station number, the station numbers running from 0 through 31, providing for dialog between all possible pairs of stations.

Messages are exchanged between stations over the data link it has been reserved by means of a standby-call procedure using the signaling link.

Messages are sent at a rate of 2.048 Mbit/s and vary in duration from 1 through 2,048 bytes, the data link being reserved for an integer number of frames sufficient to contain the message.

The data and signaling links are duplicated for reasons of security. Data is always sent in parallel on both data links, in the case of messages, or on both signaling links, in the case of signaling (standby-call procedure). Each receiving station decides which link to "monitor" according to the reception quality. Each station can itself detect the continuously activated state which it can present to each link under fault conditions, and in this case takes itself out of service.

Each station is connected to the signaling link and is allocated a time slot with a duration of 3.9 microseconds within a frame of 125 microseconds, providing for dialog between 32 stations.

This time interval enables each station to send four status bits B1, B2, B3, B4 and a standby bit V, to exchange with another station a reservation protocol bit R and a calling protocol bit A, and to make use of a test bit T to verify the absence of continuous sending by the station over the signaling link. These eight bits together constitute a signaling byte which is received and stored in a status memory provided in each station.

The signaling frame, with a duration of 125 microseconds, is divided into 32 time slots each of 3.9 microseconds. Each time slot is subdivided into eight basic periods W1 to W8. A time slot is assigned to each station. During the time slot tn which is allocated to it, a station n sends information over the signaling link in these basic periods.

The information exchanged over the signaling link comprises:

at tn.W1, tn.W2, tn.W3 and tn.W5, station n sends its four status bits B1 to B4;

at tn.W4 station n sends a reservation bit R (the conditions under which this bit is sent will be specified hereinafter);

at tn.W8 station n sends a bit indicating its send standby status (this bit has the value 1 when the station is available);

at tn.W6 station n receives a calling bit An sent by a calling station in this period tn.W6 of the called station; likewise, station n calls a station m by sending a calling bit Am at tm.W6, that is during time interval tm of the called station; in a called station, reception of the calling bit prepares the station to go to receive mode in the next following time slot tn, corresponding to the calling station;

at tn.W7 a test bit is sent to verify absence of continuous sending by the station over the signaling link.

Message exchange over the data link begins at the start of the time slot tn following the sending of the reservation bit, that is to say, in practice, 125 microseconds after reservation of the signaling link by station n. The reservation bit R is received by each station, which is thus advised of the busy state of the signaling link.

In the following description, the term station n will designate any station of which the figures represent the circuits constituting the connection module of FIG. 2, the term station m will designate a station called by station n, and the term station p will designate a station calling station n. The time slots allocated to stations n, m and p are respectively designated tn, tm and tp.

Figure 3:
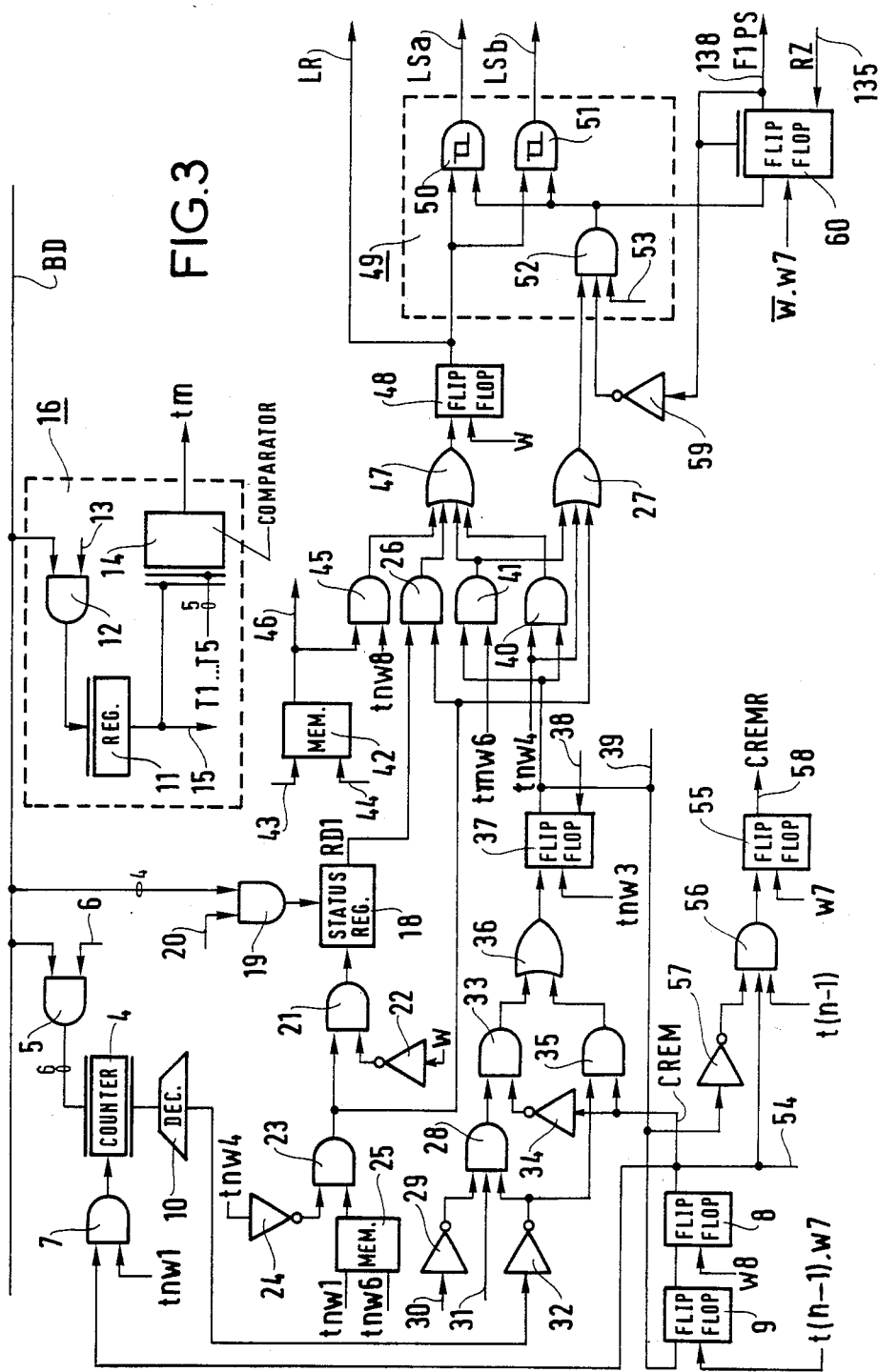
FIG. 3 is a schematic diagram of a signaling sender of a station.

FIG. 3 shows the sender of the signaling sender-receiver module 3 of station n of FIG. 2. A 6-bit downcounter 4 receives the number of frames to be sent over the data link from the station control unit over the data bus BD. This number of frames is applied to one input of an AND gate 5 which has another input which receives a write signal from the control unit over a wire 6. The downcounter 4 has its clock input connected to the output of an AND gate 7 of which one input receives a signal tn.W1 and another input is connected to the output of a flip-flop 8 which is clocked by a clock signal W8. The input of flip-flop 8 is connected to the output of a flip-flop 9 which is clocked by a clock signal t(n−1).W7. The flip-flop 9 receives on its input a reservation signal whose provenance will be indicated hereinafter. The flip-flop 8 delivers a send timing pulse signal. The output of the downcounter 4 is connected to a decoder 10 which delivers a signal when the downcounter is at zero, this signal appearing at the start of the last frame to be sent. A called station number circuit 16 delivers a timing pulse tm corresponding to the time interval allocated to the called station. It comprises a register 11 which receives the number of a called station coded on five bits over the data bus BD and through an AND gate 12 receiving on another input, over wire 13, a write signal from the control unit of station n. The output of register 11 is connected to one input of a comparator 14 of which another input receives signals T1 to T5 which are used to define the time slots t0, t1, . . . , t31. These signals, well-known to those skilled in the art, comprise:

T1 with a duration of 3.9 microseconds and a period of 7.8 microseconds,

T2 with a duration of 7.8 microseconds, a period of 15.6 microseconds and an offset of 3.9 microseconds relative to signal T1, T3 with a duration of 15.6 microseconds, a period of 31.25 microseconds and an offset of 7.8 microseconds relative to signal T2, T4 with a duration of 31.25 microseconds, a period of 62.4 microseconds and an offset of 15.6 microseconds relative to signal T3, T5 with a duration of 62.5 microseconds, a period of 125 microseconds and an offset of 31.2 microseconds relative to signal T4.

Comparison of the five bits of the called station number and signals T1 to T5 yields at the output of the comparator 14 a signal tm which corresponds to the time slot allocated to the called station m.

Figure 4:
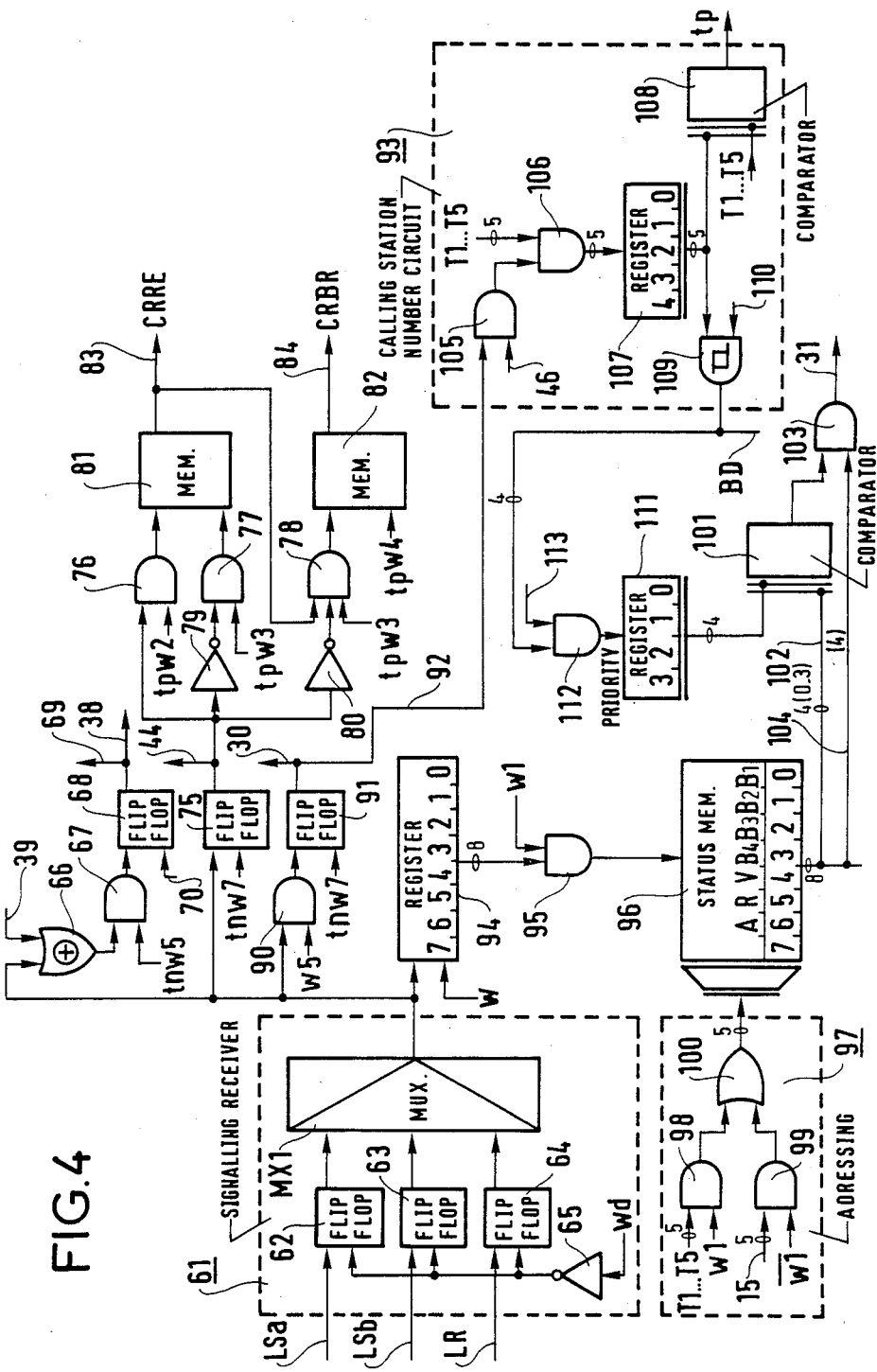
FIG. 4 is a schematic diagram of a signaling receiver of a station.

The output of the register 11 is connected to a wire 15 which is used to route the number of the calling station to the receiver of the signaling sender-receiver module (FIG. 4).

The four status bits of station n are loaded into a status register 18, which is a shift register connected to the data bus BD through an AND gate 19 which is enabled by a signal delivered by the control unit on wire 20. The status register 18 is loaded in parallel with shifted output. Shifting, and thus reading, of the status register 18 is commanded by an AND gate 21 having one input connected to an inverter 22 to which is applied the signal W with a duration of 244 nanoseconds and a period of 488 nanoseconds and another input connected to the output of an AND gate 23. One input of the AND gate 23 is connected to an inverter 24 receiving on its input a signal tn.W4, and another input is connected to the output of a memory cell 25 receiving on its signal input the signal tn.W1 and on its reset input the signal tn.W6. Thus the status register 18 delivers the four status bits of station n at times tn.W1, tn.W2, tn.W3 and tn.W5.

The output of the status register 18 is connected to one input of an AND gate 26 of which another input is connected on the one hand to the output of the AND gate 23 and on the other hand to the input of an OR gate 27. A three-input AND gate 28 has a first input connected to the output of an inverter 29 having its input connected by a wire 30 to the receiver (FIG. 4) of the signaling sender-receiver module, and receives a reservation signal indicating whether or not the signaling link is reserved by another station. This reservation signal has the value 1 if the signaling link is already reserved and the value 0 if it is free. A second input of the AND gate 28 is connected by a wire 31 to the receiver of the signaling sender-receiver module, and receives a receiver standby signal, with the value 1 if the receiver is on standby and the value 0 in the contrary case. A third input of the AND gate 28 is connected to the output of an inverter 32 having its input connected to the output of the decoder 10 from which it receives a signal with value 0 provided that the number of frames to send is not 0.

An AND gate 33 has one input connected to the output of the AND gate 28 and another input connected through an inverter 34 to the output of the flip-flop 8. An AND gate 35 has one input connected to the output of the inverter 32 and another input connected to the output of the flip-flop 8. An OR gate 36 has one input connected to the output of the AND gate 33 and another input connected to the output of the AND gate 35. A flip-flop 37 has its input connected to the output of the OR gate 36 and receives the signal tn.W3 on its clock input. Its reset input is connected by a wire 38 to the receiver (FIG. 4) of the signaling sender-receiver module, from which it receives a reservation bit missing signal. The output of the flip-flop 37 is connected by a wire 39 on the one hand to the input of the flip-flop 9 and on the other hand to the receiver (FIG. 4) of the signaling sender-receiver module. The output of the flip-flop 37 is also connected on the one hand to one input of an AND gate 40 receiving on another input a signal tn.W4 and on the other hand to one input of an AND gate 41 receiving on another input a signal tm.W6 corresponding to bit 6 of the time slot allocated to the called station m. The output of the AND gate 41 is connected to one input of the OR gate 27 of which another input receives the signal tn.W4.

A memory cell 42 has its signal input connected by a wire 43 to the control unit and receives from the latter a signal with the value 1 when station n wishes to send on the data link. The reset input of the memory cell is connected by a wire 44 to the receiver of the signaling sender-receiver module and receives a signal when station n receives a calling bit sent by a calling station which is calling station n. The output of the flip-flop 42 is connected on the one hand to one input of an AND gate 45 receiving on another input a signal tn.W8 to send the send standby bit of station n and on the other hand, by a wire 46, to the receiver of the signaling sender-receiver module.

An OR gate 47 has four inputs respectively connected to the outputs of AND gates 26, 40, 41 and 45, its output being connected to the signal input of a flip-flop 48 receiving the signal W on its clock input. A signalling sender circuit 49 has its input connected to the output of the flip-flop 48 and to the output of the OR gate 27. It comprises three AND gates 50, 51 and 52: the AND gate 50 has one input 50 connected to the output of the flip-flop 48 and another input connected to the output of the AND gate 52; the AND gate 51 has one input connected to the output of the flip-flop 48 and one input connected to the output of the AND gate 52; the AND gate 52 has one input connected to the output of the OR gate 27 and one input connected by a wire 53 to the control unit from which it receives a signaling enable signal. The AND gate 52 also has another input connected through an inverter 59 to the output of a flip-flop 60 having a signal input connected to the output of the AND gate 52 and receiving a signal $\overline{W}.W7$ on its clock input. The output of the flip-flop 60 is connected on the one hand to a store input of the flip-flop 60 and on the other hand to a wire 138. The reset input of the flip-flop 60 is connected by a wire 135 to the control unit. The AND gate 52 is enabled during time tn, except for time tn.W7 which is not used in the exchange procedure if the signal delivered by the OR gate 27 is correct. If this signal comprises the bit corresponding to W7 the flip-flop 60 delivers an error signal FIPS and disables the AND gate 52 through the inverter 59.

The output of the AND gate 50 is connected to the signaling link LSa and the output of the AND gate 51 is connected to the signaling link LSb. The output of the flip-flop 48 is also connected, via a loopback link LR, to the receiver of the signaling sender-receiver module.

Figure 5:
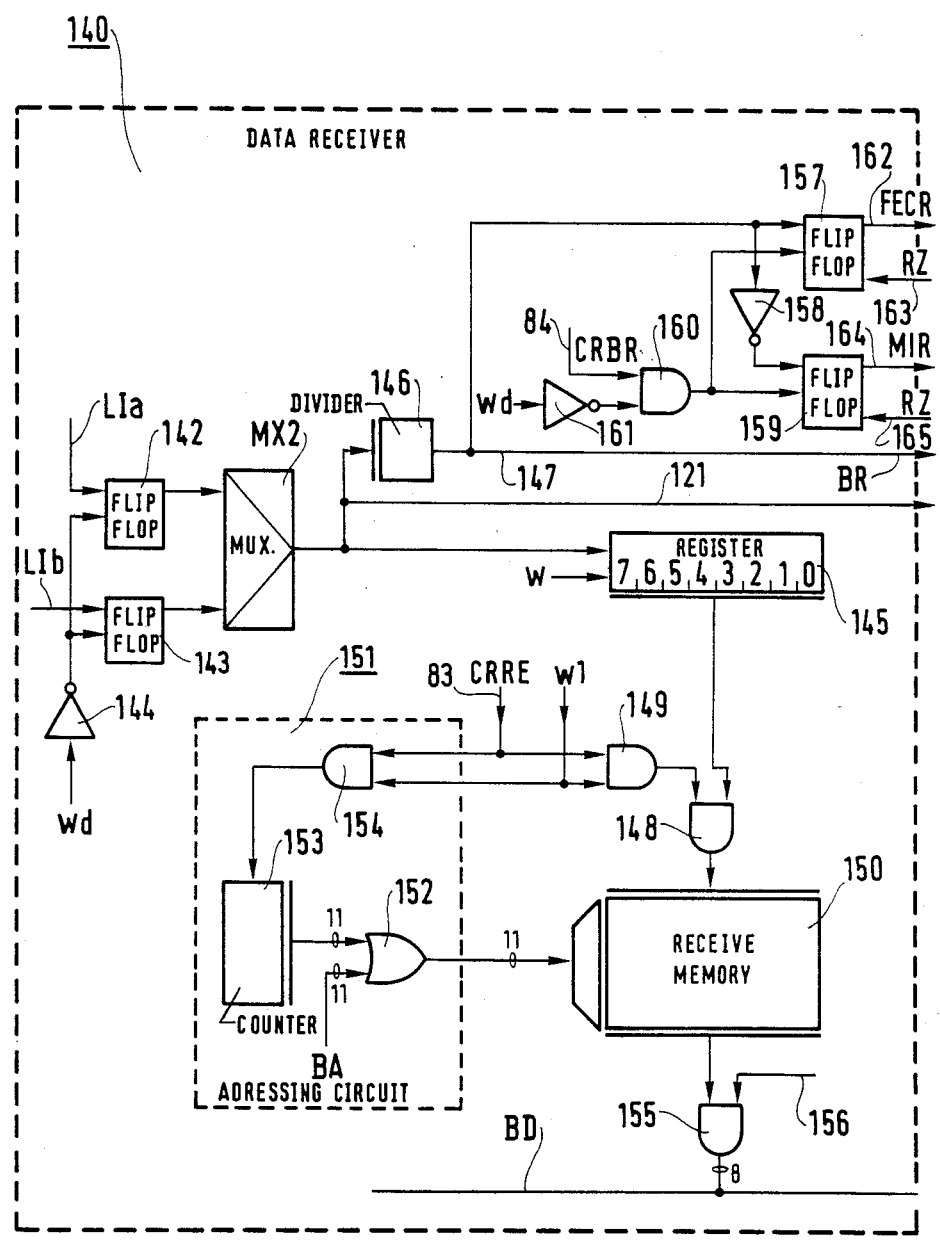
FIG. 5 is a schematic diagram of a data receiver of a station.
Figure 7:
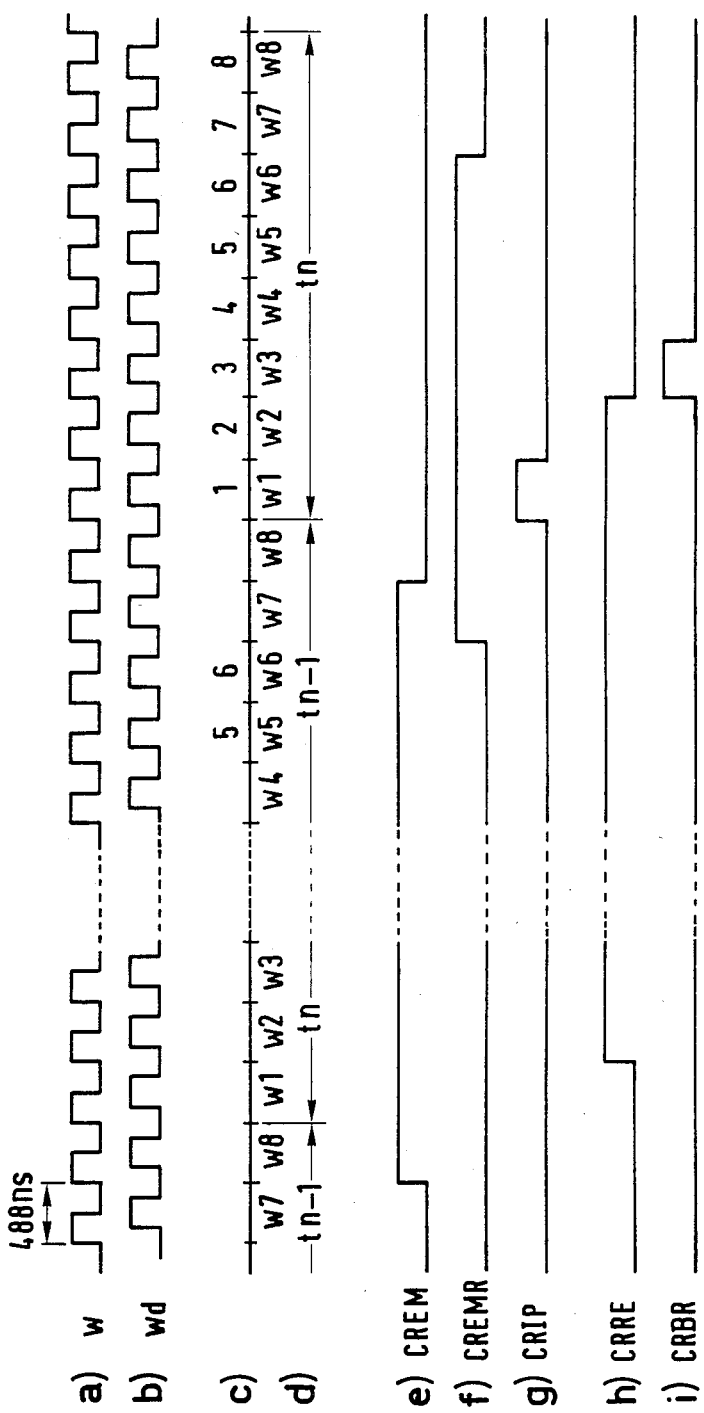
FIG. 7 shows various signals utilized in the signaling and data senders and receivers.

The input of the flip-flop 9 is connected to the output of the flip-flop 37 which delivers a reservation signal at time tn.W3 if station n wishes to reserve the signaling and data links. The clock input of the flip-flop 9 receives a signal t(n−1).W7. The output of the flip-flop 9 is connected to the input of the flip-flop 8 of which the clock input receives a signal W8. The flip-flop 8 delivers a "send timing pulse" signal CREM the duration of which is between 1 and 64 frames, depending on the length of the message to be sent by the station n, the length of the message being supplied to the downcounter 4 by the control unit. The output of the flip-flop 8 is also connected by a wire 54 to the data sender-receiver module (FIG. 5). The send timing pulse signal CREM delivered by the flip-flop 8 (wire 54) thus starts at time t(n−1).W8, in practice 125 microseconds after the sending of the reservation bit by station n, and terminates after an integer number of frames at t(n−1).W7, as shown in FIG. 7.

A flip-flop 55 has a signal input connected to the output of an AND gate 56 having an input connected through an inverter 57 to the output of the flip-flop 37 and an input connected to the output of the flip-flop 8, receiving the signal t(n−1) on a further input. The flip-flop 55 receives the signal W7 on its clock input and delivers at its output, over a wire 58, an end of sending timing pulse signal CREMR. This signal CREMR has the value 1 at time t(n−1).W7 of the last frame sent since the reservation signal delivered by the flip-flop 37 is null from time tn.W3 of this latter frame. The signal CREMR has the value 1 until time tn.W7 at which it returns to a null value, as shown in FIG. 7, since the signal CREM is reset at t(n−1).W8.

FIG. 4 shows the receiver of the signaling senderreceiver module. A signaling receiver circuit 61 consists of a multiplexer MX1 and three flip-flops 62, 63, 64. The signal input of the flip-flop 62 is connected to the signaling link LSa, the signal input of the flip-flop 63 is connected to the signaling link LSb, and the signal input of the flip-flop 64 is connected to the loopback link LR of the signaling sender of the station. The clock input of each of the three flip-flops is connected to the output of an inverter 65 which receives on its input a signal Wd corresponding to the signal W shifted backwards by a quarter-period.

As the flip-flops are triggered on the rising edge of the signal $\overline{W}d$ delivered by the inverter 65, the various bits on the signaling link are in practice acted on at a time corresponding to the last quarter of the time period corresponding to each bit. At the multiplexer output the various bits are strobed either by the signal W or, in the case of certain specific bits, in the time period following that allocated to them. Thus the reservation bit sent at time ti.W4 by station i is acted on at time ti.W5. The output of each flip-flop is connected to an input of the multiplexer MX1.

The output of the multiplexer MX1 is connected to one input of an exclusive-OR gate 66 of which another input is connected to the wire 39 from the output of the flip-flop 37 of the signaling sender (FIG. 3). The output of the exclusive-OR gate is connected to one input of an AND gate 67 of which another input receives the signal tn.W5. Thus a reservation bit sent by station n reaches the exclusive-OR gate of station n, on the one hand through the intermediary of the signaling receiver 61 and on the other hand via wire 39. If the reservation bit is present at the two inputs of the exclusive-OR gate, the output of this gate is at 0. If the reservation bit is present on one input only, the output of the exclusive-OR gate has the value 1 and this value is taken into account at tn.W5 by the AND gate 67 of which the output is connected to the input of a memory cell 68. The output of the memory cell is connected on the one hand to the control unit by the wire 69 and on the other hand to the reset input of the flip-flop 37 of the signaling sender (FIG. 3) by the wire 38. The memory cell 68 delivers a reservation bit missing signal and it is reset to 0 by the control unit to which the reset input of the memory cell 68 is connected by the wire 70.

The output of the multiplexer MX1 is also connected to a signal input of a flip-flop 75 of which the clock input receives the signal tn.W7. This flip-flop 75 thus delivers a signal when station n receives a calling bit sent by a calling station p at time tn.W6. The output of the flip-flop 75 is connected by the wire 44 to the reset input of the memory cell 42 of the signaling receiver (FIG. 3). The output of the flip-flop 75 is also connected directly to an input of an AND gate 76 and through an inverter 79 to an input of an AND gate 77 and through an inverter 80 to an input of an AND gate 78. The AND gate 76 receives on another input the signal tp.W2 corresponding to time W2 of the time slot tp allocated to a calling station. The output of the AND gate 76 is connected to a signal input of a memory cell 81 which delivers a "receive timing pulse" signal CRRE and is connected by a wire 83 to the receiver of the data sender-receiver module shown in FIG. 5.

The AND gate 77 receives on another input the signal tp.W3 and its output is connected to a reset input of the memory cell 81. The AND gate 78 receives on one input the signal tp.W3 and has another input connected to the output of the memory cell 81. Its output is connected to a signal input of a memory cell 82 receiving on its reset input the signal tp.W4. The output of the memory cell 82 delivers a "timing pulse received OK" signal CRBR and is connected to the data sender shown in FIG. 5 by a wire 84.

The output of the multiplexer MX1 is also connected to an input of an AND gate 90 receiving on another input the signal W5. The output of the AND gate 90 is connected to a signal input of a memory cell 91 receiving on its reset input the signal tn.W7. The output of the memory cell 91 is connected on the one hand to the inverter 29 of the signaling sender (FIG. 3) by the wire 30 and on the other hand to a calling station number circuit 93 by the wire 92. The memory cell 91 delivers a reservation signal when a reservation bit has been sent over the signaling link by another station.

The output of the multiplexer MX1 is also connected to a signal input of an 8-bit register 94 of which the clock input receives the signal W. This register has a parallel output and is connected to the input of an AND gate 95 of which another input receives the signal W1. The output of the AND gate is connected to the input of a status memory 96 with a capacity of 32 words each of 8 bits. The status memory 96 is addressed by an addressing circuit 97 comprising two AND gates 98, 99 and an OR gate 100. The AND gate 98 receives on one input the signals T1 to T5 giving the numbers of the 32 stations in succession and on another input the signal W1. The AND gate 99 has one input connected by the wire 15 to the output of the register 11 of FIG. 3 which delivers the number of the station called by station n and receives on another input the signal $\overline{W}1$. Each AND gate has its output connected to one input of the OR gate 100 of which the output is connected to the status memory addressing input. The addressing circuit 97 provides for time addressing of the status memory via the AND gate 98, by means of the numbers of the time slots allocated to the stations. This provides for the writing into the status memory of the information contained in register 94. The AND gate 99 provides for space addressing of the memory in read mode, that is to say the reading of the memory word corresponding to a called station. For each station, the register 94 receives the information sent by it over the signaling ink in the time slot allocated to it. Thus after transfer into the status memory 96, the latter contains the status for all stations, specified for each station by the four status bits B1, B2, B3, B4, the reservation bit R, the standby bit V and the calling bit A, if any, received by the station. If station n wishes to call station m, it reads on its status memory the word corresponding to station m in order to find out if it is available.

The status memory 96 has its output connected on the one hand to an input of a comparator 101 by a wire 102 carrying the four status bits of a station and on the other hand to an input of an AND gate 103 by a wire 104 carrying the standby bit, the reservation bit, the calling bit received and the test bit of a station. Another input of the comparator 101 is connected to an output of a 4-bit priority register 111 with its input connected to the output of an AND gate 112. One input of the AND gate 112 is connected to the data bus BD and another input is connected to the control unit by a wire 113 which carries a signal authorizing writing in the priority register 111. The output of the comparator 101 is connected to another input of the AND gate 103 of which the output is connected by the wire 31 to one input of the AND gate 28 of the signaling sender (FIG. 3).

If station n calls station m the four bits of the priority code of the message to be sent by the station n are loaded into the priority register 111. Station n reads in its status memory 96 the four status bits of the called station m. If the priority of the message to be sent is compatible with the status of the called station, that is to say if the status of the called station m is greater than or equal to the priority code of the message to be sent, the comparator 101 of station n delivers a signal to the AND gate 103 and the presence of the standby bit of the called station, on reading the word in the status memory 96 corresponding to the called station m, enables the AND gate 103 which delivers on the wire 31 a resultant standby signal. This resultant standby signal is applied to the AND gate 28 of the signaling sender (FIG. 3) and is one condition for generation by the flip-flop 37 of the reservation signal for transmission of the reservation bit R over the signaling link.

The "calling station number" circuit 93 enables the number of the calling station p to be determined and delivers a signal corresponding to the time slot tp allocated to the calling station. To this end, an AND gate 105 has one input connected to the output of the memory cell 91 which thus delivers a reservation signal as soon as a reservation bit has been sent by a station. Another input of the AND gate 105 is connected by the wire 46 to the output of the memory cell 42 (FIG. 3) which delivers a send standby signal when station n is not sending and is not called. If station n is called, the memory cell 42 is reset to zero by the signal delivered by the memory cell 75 of FIG. 4, as soon as the calling bit is received, which prevents any sending from station m. The output of the AND gate 105 is connected to one input of an AND gate 106 which receives the signal T1 to T5 on another input. The output of the AND gate 106 is connected to a 5-bit register 107. The AND gate 106 is thus enabled by the AND gate 105 on the rising edge of the signal delivered by the AND gate 105, that is to say when a calling station p sends a reservation bit and station n is on send standby. The output of the register 107 is connected to an input of a comparator 108 which receives the signals T1 to T5 on another input. The comparator output delivers a signal tp corresponding to the time slot allocated to the calling station. The output of the register 107 is also connected to an input of an AND gate 109 having another input connected by a wire 110 to the control unit from which it receives a register 107 read signal. The output of the AND gate 109 is connected to the data bus BD.

In station n the flip-flop 75 (FIG. 4) receives in its time slot tn the calling bit sent by the calling station at time tn.W6, so that only the flip-flop 75 of the called station n delivers a signal from which the memory cell delivers a receive timing pulse signal CRRE and the memory cell 82 delivers a "timing pulse received OK" signal CRBR until the end of the receive timing pulse CRRE (FIG. 7) which provides for acknowledging reception (correct or incorrect) of the message received. In the other stations the calling bit has no effect on the flip-flop 75 and, consequently, on the memory cells 81 and 82. Similarly, only the memory cell 42 (FIG. 3) of the called station n is set to zero by the signal delivered by the flip-flop 75 of station n. In all stations the number contained in the register 107 and transmitted by the AND gate 109 to the control unit over the data bus BD is the number of the calling station which is calling station n. In each station the reservation bit sent by the calling station p is acted on a W5 and the memory cell 91 delivers a signal of value 1 until in each station the signal tn.W7 of the latter resets it to zero. The reservation signal delivered by the memory cell 91 on the wire 30 also prevents the sending of a reservation bit in the stations, since this signal, of value 1, is applied to one input of the AND gate 28 (FIG. 3) after inversion and the flip-flop 37 (FIG. 3) is thus disabled, so that it does not deliver a signal at time tn.W3 which is allocated to the station in question, the memory cell 91 being reset to zero only at time tn.W7 of this station.

FIG. 5 shows a data receiver 140 of a data sender-receiver module of a station.

The data receiver 140 comprises at its input two flip-flops 142, 143 with their inputs respectively connected to the information links LIa and LIb. An inverter 144 receives on its input the signal Wd and its output is connected to the clock input of the two flip-flops. The output of each flip-flop is connected to a respective input of a multiplexer MX2 of which the output is connected to a serial input of an 8-bit register 145 of which the clock input receives the signal W, to a divider by two 146 of which the output is connected by a wire 147 to the data sender, and to a wire 121 connected to the data sender (FIG. 6).

The divider by two computes the odd parity to all bits of the received message, including the odd parity bit sent, and delivers a signal with value 1 when the computed odd parity is correct. The output of the divider by two is also connected directly to a signal input of an end of receive exchange flip-flop 157 and through an inverter 158 to the signal input of a receive odd parity error flip-flop 159. An AND gate 160 has one input connected to the wire 84 from which it receives a timing pulse received OK signal CRBR and another input connected to an inverter 161 which receives on its input the signal Wd. The output of the AND gate 160 is connected to the clock input of each of the flip-flops 157, 159. The flip-flop 157 has its output connected by a wire 162 to the control unit and delivers an end of receive exchange signal FECR. It reset input RZ is connected by a wire 163 to the control unit. The flip-flop 159 has its output connected by a wire 164 to the control unit and delivers a receive odd parity error signal MIR. Its reset input RZ is connected by a wire 165 to the control unit. At the end of a message the flip-flop 82 (FIG. 4) of the called station delivers a signal CRBR at time tp.W3. If the computed odd parity is correct on reception in the called station the flip-flop 157 of this station delivers a signal FECR. If the odd parity is incorrect flip-flop 159 delivers a receive odd parity error signal.

The parallel output of the register 145 is connected to one input of an AND gate 148 of which another input is connected to the output of an AND gate 149 having an input connected by the wire 83 to the output of the memory cell 81 of the signaling receiver (FIG. 4) which delivers a "receive timing pulse" signal CRRE. The AND gate 149 receives the signal W1 on another input. The output of the AND gate 148 is connected to the input of a receive memory 150 with a capacity of 2,048 bytes which is addressed by an addressing circuit 151. This addressing circuit comprises an OR gate 152, a counter 153 and an AND gate 154. The AND gate 154 has one input connected to the wire 83 and receives the signal W1 on another input. Its output is connected to the clock input of the counter 153 of which the output is connected to one input of the OR gate 152, another input of the OR gate being connected to the address bus BA. The output of the OR gate 152 is connected to the addressing input of the receive memory 150. The counter 153 provides for time addressing of the receive memory in write mode (on reception of a message) and the address bus BA provides for reading of the receive memory by the control unit in order to acquire the message received. The output of the receive memory 150 is connected to one input of an AND gate 155 of which another input is connected by a wire 156 to the control unit and receives from the latter a receive memory read signal. The output of the AND gate 155 is connected to the data bus BD.

Figure 6:
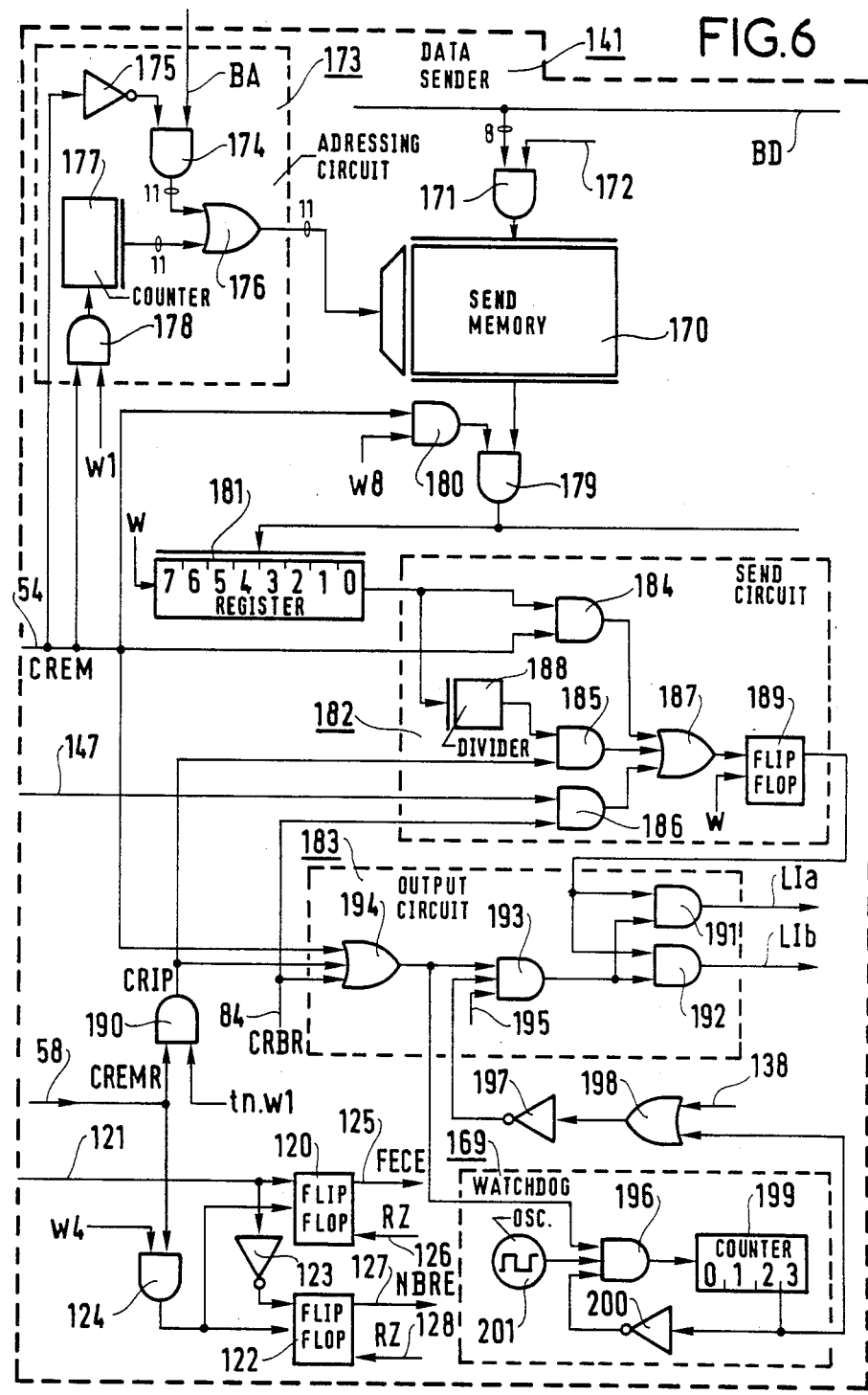
FIG. 6 is a schematic diagram of a data sender of a station.

FIG. 6 shows the data sender 141 which comprises a send memory 170 with a capacity of 2,048 bytes and with its input connected to the output of an AND gate 171 having one input connected to the data bus BD and another input connected by a wire 172 to the control unit. A send memory addressing circuit 173 comprises and AND gate 174, an inverter 175, an OR gate 176, a counter 177 and an AND gate 178. The AND gate 174 has one input connected to the address bus BA and another input connected to the wire 54 through an inverter 175, the wire 54 originating from the output of the flip-flop 8 (FIG. 3) which delivers the "send timing pulse" signal CREM following the sending of a reservation bit by the station. The output of the AND gate 174 is connected to one input of an OR gate 176 of which the output is connected to the addressing input of the send memory. Another input of the OR gate is connected to the output of a counter 177 of which the clock input is connected to the output of an AND gate 178. One input of the AND 178 is connected to the wire 54 and another input of the AND gate receives the signal W1.

The output of the send memory 170 is connected to one input of an AND gate 179 having another input connected to the output of an AND gate 180. This AND gate 180 has one input connected to the wire 54 and receives on another input the signal W8. The output of the AND gate 179 is connected to one input of an 8-bit register 181. The addressing circuit 173 provides for space addressing of the send memory by the control unit via the address bus BA and time addressing by the counter 177 which receives a clock signal at each time W1 during the duration of the "send timing pulse" signal CREM (wire 54), the duration of this signal depending on the number of frames to send (FIG. 3). The counter 177 is therefore incremented at periods W1 and addresses the send memory 170, transfer into the register 181 occurring at periods W8 during the duration of the "send timing pulse" signal CREM (wire 54), the first transfer occurring during period W8 preceding the first incrementing of the counter. The clock input of the register 181 receives the signal W which provides for serial shifting of the register in read mode. The register 181 has its output connected to a send circuit 182 the output of which is connected to an output circuit 183 the output of which is connected to the data links LIa and LIb. The send circuit 182 comprises three AND gates 184, 185, 186 with their outputs connected to an OR gate 187, a divider by two 188 and a flip-flop 189 of which the signal input is connected to the output of the OR gate 187 and of which the clock input receives the signal W. The AND gate 184 has one input connected to the output of the register 181 and another input connected to the wire 54 (CREM). The divider by two 188 has its input connected to the output of the register 181 and its output connected to one input of the AND gate 185 of which another input is connected to the output of an AND gate 190 which delivers an odd parity timing pulse signal CRIP. The AND gate 190 has one input connected to the wire 58 from the flip-flop 55 (FIG. 3) and receives on another input the signal tn.W1. Signal CRIP is shown in FIG. 7. It thus appears after the last frame sent. The divider by two computes the parity of the message delivered by the register 181 and its output has the value 1 if the message sent comprises an even number of bits at 1 and the value 0 in the contrary case. The AND gate 186 has one input connected by the wire 147 to the divider by two 146 (FIG. 5) and another input connected to the wire 184 from the memory cell 82 (FIG. 4) which delivers a timing pulse received OK signal CRBR. In a receiving, and therefore called, station the divider by two 146 thus computes the odd parity of the combination of the message and the odd parity bit sent by a sending station and the result is sent via the AND gate 186 at time tp.W3 corresponding to the timing pulse received correct signal CRBR.

The flip-flop 189 is clocked by signal W and sends to the output circuit 183 the signals from the AND gates 184, 185, 186. In the sending station n the odd parity bit is thus sent in the byte which follows the last frame of the message sent, that is to say at time tn.W1, and in the receiving (called) station the received OK response from the divider by two 146 is sent in this same byte at time tn.W3.

The output circuit 183 comprises three AND gate 191, 192, 193 and an OR gate 194. The AND gate 191 has one input connected to the output of the flip-flop 189 and another input connected to the output of the AND gate 193. The AND gate 192 has one input connected to the output of the flip-flop 189 and another input connected to the output of the AND gate 193. The AND gates 191 and 192 have their outputs connected to the data links LIa and LIb, respectively. An OR gate 194 has one input connected to the wire 54 (signal CREM from the flip-flop 8 of FIG. 3), one input connected to the output of the AND gate 190, and another input connected to the wire 84 (signal CRBR from the flip-flop 82 of FIG. 4). The output of the OR gate 194 is connected on the one hand to one input of a watchdog timer 169 and on the other hand to one input of AND gate 193. The AND gate 193 has one input connected to the control unit by a wire 195 and receives from it a send enable signal and another input connected via an inverter 197 to the output of an OR gate 198 having one input connected to the output of the watchdog timer 169 which consists of an oscillator 201, an AND gate 196, a counter 199 and an inverter 200. The input of the counter 199 is connected to the output of the AND gate 196. The MSB output of the counter is connected on the one hand to an input of the OR gate 198 and one the other hand to an input of the AND gate 196 via the inverter 200, another input of the AND gate 196 being connected to the output of the AND gate 194. The oscillator is connected to another input of the AND gate 196. Thus in the calling station the watchdog timer is set at the start of sending by the signal from the OR gate 194. The count time of the counter is 8 milliseconds, corresponding to a message of 64 frames. If the watchdog timer times out, it delivers an error message which disables sending on the data link. Another input of the OR gate 198 is connected to the wire 138 (signal FIPS from the flip-flop 60 of FIG. 3).

Sending on the data link during the timing pulses CREM (wire 54), CRIP and CRBR (wire 84) is conditioned by a send enable signal delivered by the control unit (wire 195). An error resulting in sending for more than 8 milliseconds causes the watchdog timer to time out which disables the output circuit 183.

An end of sending exchange flip-flop 120 has its signal input connected to the wire 121 from the output of the multiplexer MX2 of the data receiver (FIG. 5). A transmission not received correctly in send mode (NBRE) flip-flop 122 has its signal input connected to the wire 121 by an inverter 123. An OR gate 124 has one input connected to the wire 158 and receives the signal W4 on another input, its output being connected to the clock input of each of flip-flop 120, 122. The output of the flip-flop 120 is connected to the control unit by a wire 125 and delivers an end of send exchange signal FECE. Its reset input RZ is connected by a wire 126 to the control unit. The output of the flip-flop 122 is connected to the control unit by a wire 27 and delivers a transmission not received correctly in send mode signal NBRE. Its reset input RZ is connected by a wire 128 to the control unit.

At the end of the message it has received, a called station produces a signal CRBR by means of the memory cell 82 (FIG. 4). This signal enables the called station to send over the data link the received correctly bit if the odd parity checked on reception by the divider by two 146 is correct. The calling station receives this bit which is sent by the wire 121 to the flip-flops 120, 122. If the received correctly bit sent by the called station has the value 1, which signifies that the message has been received correctly, the flip-flop 120 delivers an end of send exchange signal FECE. If the received correctly bit sent by the calling station has the value 0, which signifies that the message was not received correctly, it is the flip-flop 122 which delivers a not received correctly in send mode signal NBRE, and the calling station can decide to send its message again.

FIG. 7 represents various signals at a, b, c, d, e, f, g, h, i:

a represents the signal W, b represents the signal Wd which is the signal W offset by one quarter-period, c represents the basic time periods which constitute each time slot t0 through t31, d represents the time slots tn−1 and tn at the beginning of sending of a message by the calling station n and then the end of sending time slots tn−1 and tn, e represents the send timing pulse signal CREM, f represents the end of sending timing pulse signal CREMR, g represents the odd parity bit send timing pulse signal CRIP, h represents the receive timing pulse signal CRRE produced in the called station, i represents the received correctly timing pulse signal CRBR which is produced in the called station and provides for the sending of the received correctly signal following the receive odd parity check.

Signals h and i are delivered by flip-flops 81 and 82, respectively (FIG. 4). They occur in the time slot tp which corresponds to the time slot of the calling station. Thus if it is assumed that the calling station is station n, which is the case in FIG. 7, in a called station m this time slot tp corresponds to the time slot tn. In FIG. 4, and for the called station m, the times tn.W5, tn.W7, etc . . . are then those of the called station m, that is to say tm.W5, tm.W7, etc . . .

There will now be described, by way of example only, an exchange of messages between two stations, assuming that station 3 calls station 9, the time slots allocated to the stations are t3 and t9, respectively, and the message length is 15 frames.

In station 3, the control unit loads the downcounter 4 (FIG. 3) with the number of frames in the message to be sent, 15 in this instance. It delivers to the called station number circuit 16 the number 9 and displays in the priority register 111 (FIG. 4) the priority of the message to send. Station 3 reads the status bits and the standby bit of station 9 in the status memory 96, the latter bit indicating that station 9 is unavailable. If the standby bit has the value 1 and if the signaling link LSa, LSb is free, this signifies that no reservation bit has been sent by another station, and if the priority of the message to send is compatible with the status of station 9, station 3 sends a reservation bit at t3.W3. This bit is produced from the signal delivered by the flip-flop 37 and is sent via the AND gate 40 and the flip-flop 48. Sending this reservation bit provides for reserving the signaling link for the 125 microseconds following its sending. The reception of this bit in each station registers the busy state of the signaling link. In all stations, and in station 9 in particular, reception of the reservation bit sets the memory cell 91 and the circuit 93 delivers the number of the calling station (3 in this instance) to the data bus BD and generates the time slot tp corresponding to the calling station 3, that is to say the time slot t3. In the calling station 3, the reservation bit enables the sending (AND gate 141) of a calling bit at time tm.W6, that is to say at time t9.W6 assigned to the called station which is station 9 in this instance. This calling bit invites station 9 to select receive mode from the first time slot t3 following transmission of the calling bit. In the called station 9, following reception of the calling bit, the flip-flop 81 delivers the received timing pulse signal CRRE from time tp.W2, that is to say t3.W2, since for station 9 the calling station p is station 3. The exchange over the data link begins at the commencement of the time slot t3 which follows the sending of the reservation bit, that is approximately 125 microseconds after this sending.

The flip-flop 8 of station 3 delivers a send timing pulse signal CREM at time t2.W8 in the first time slot t2 which follows the sending of the reservation bit. In the data sender 141 of FIG. 6, this signal enables the AND gate 180 which authorizes the loading of register 181 at t2.W8 and all following periods W8 during the duration of signal CREM. The shift register is commanded by the signal W, as is the flip-flop 189, so that sending of the first bit of the message takes place correctly at t3.W1. The message is then sent without interruption.

The number of frames to send is decremented by 1 in the downcounter 4 by the action of signal CREM at t3.W1.

125 microseconds after the sending of the first reservation bit, the calling station 3 sends a new reservation bit at t3.W4 to reserve the signaling link for a further 125 microseconds. Another calling bit is also sent under the same conditions as previously, in order to maintain the called station 9 in receive mode. The sending of reservation and calling bits is repeated as many times as there are frames to send, that is to say 15 in the example selected. At the beginning of the last frame, frame 15, and thus at time t3.W1, the downcounter 4 reaches zero and the decoder 10 delivers a signal of value 1, which disables the AND gate 35. The output of the flip-flop 37 goes to zero with the result that the reservation bit and the calling bit are no longer sent and the signal CREM reverts to zero at the end of the frame, at time t2.W8. Following the message, station 3 sends the computed odd parity bit, the AND gate 185 being enabled by the AND gate 190 and the flip-flop 189 being activated by the signal W. The odd parity bit is sent at t3.W1. In the receiving station 9, the divider by two 146 checks the odd parity for the combination consisting of the message and the odd parity bit sent by station 3. The received correctly bit thus produced is sent by station 9 via the AND gate 186 enabled by the signal CRBR which appears at time tp.W3, that is to say t3.W3. The sending station 3 receives the received correctly bit sent by station 9 and, depending on the value of this bit, either the end of send exchange flip-flop 120 or the not received correctly in send mode flip-flop 122 is activated. The control unit of the sending station 3 is thus advised of the correct or incorrect reception of the message.

In the time slot allocated to each station, the order of the various bits has been given by way of example only and the various times tn.W1, tn.W2, . . . , tn.W8 relative to each bit are indicated in the figures. If a different distribution of the bits within the time slot is used, it is necessary to use the timing signals corresponding to each bit, although this does not depart from the scope of the invention. Thus, for example, it is possible to send the four status bits at tn.W1, tn.W2, tn.W3, tn.W4 and the reservation bit at tn.W5. In selecting a distribution, those skilled in the art need take account only of the constraints inherent to the circuits that are used, in other words check that the rise times of the timing signals such as W, W1, W2, . . . , W8 are not incompatible with the selected distribution, for certain signals to be recognized. All this is well-known to those skilled in the art.

It will be understood that various changes in the details, materials and arrangements of parts, which have been herein described and illustrated in order to explain the nature of the invention, may be made by those skilled in the art within the principle and scope of the invention as expressed in the appended claims.

I claim:
1. A system for exchanging encoded messages between stations connected by a signalling link and a data link, wherein each station is connected to a general time base and includes a control unit, a connection module responsive to said control unit and connected to the signalling and data links, and an address bus and data bus connecting the control unit to the connection module, wherein the signalling and data links are serial multiplex links synchronous with the time base, a time slot in a signalling frame is assigned to each station, and the messages to be transmitted are of different lengths and are contained within an integer number of frames, and wherein each connection module comprises:
 first means at each connection module for generating a status signal corresponding to its own status to be sent during its respective time slot;
 a signalling sender circuit responsive to said first means for sending said status signal onto said signalling links;
 a signalling receiver circuit at each connection module connected to said signalling links for receiving said status signals from other stations;
 a station status memory at each connection module for storing the status signals of each of said stations received from said signalling receiver circuit;
 a message send memory for storing a message to be sent when a station is operating as a calling station, said message to be sent containing a plurality of frames of information;
 counter means, decremented in response to the transmission of each frame of said message to be sent, for indicating the number of frames of said message remaining to be sent, when a station is operating as a calling station;
 second means responsive to said counting means for producing a signal when the number of frames of said message remaining to be sent is zero;
 reservation signal generating means, responsive to outputs from said counting means and second means indicating a non-zero content in said counting means, for, when a station is operating as a calling station, generating a reservation signal during the time slot of said calling station and having a duration equal to said plurality of frames of information;
 third means, responsive to said reservation signal generating means, for sending a reservation bit signal over said signalling links in the respective time slot of said calling station, for receiving said signalling links for a duration of one frame, said reservation bit signal being sent at each frame except when said number of frames remaining to be sent is zero;
 fourth means, connected to the control unit, for, when a station is operating as a calling station, producing a signal corresponding to the time slot of a called station;
 fifth means for, when a station is operating as a calling station, sending a calling bit over the signalling link in the time slot of the called station;
 six the means for, when a station is operating as a called station, producing a signal corresponding to the time slot of the calling station;
 first addressing means for addressing said message send memory for reading out the message to be sent when a station is operating as a calling station;

an output circuit connected to said data links for sending the message read out from said message send memory;

a message receiver circuit for receiving message information from said data links when a station is operating as a called station;

second addressing means;

a message receive memory responsive to said second addressing means for storing means information received by said message receiver circuit, when a station is operating as a called station;

seventh means for, when a station is operating as a calling station, producing at the end of each frame of said reservation signal a send timing pulse signal for decrementing said counting means and for activating said reservation signal generating means, first addressing means and message sender circuit, when the number of frames of said message remaining to be sent is non-zero; and eighth means, responsive to said send timing pulse signal produced at the end of each frame of said reservation signal, for, when said number of frames of said message remaining to be sent is zero, producing an end of sending timing pulse signal for activating said message sender circuit in the time slot of the calling station in order to send an odd parity bit after said message information.

2. A system according to claim 1, wherein the station status memory also contains, for each station, the state of a standby bit indicating if the station is available, and wherein the connection module further comprises:

means for indicating a priority of a message to be transmitted, means for comparing the priority with the status of the called station, as read from the station status memory, means, responsive to an output from said means for comparing and an output from said station status memory, for producing a resultant standby signal in accordance with the comparison result and the state of the standby bit of the called station, means for indicating if the signaling link is free, and means for delivering an activating signal to the reservation signal generating means when the number of frames of the message indicated by the counter means is not zero, when the resultant standby signal is produced and when the signalling link is free.

3. A system according to claim 1, wherein the connection module further comprises: means for receiving a calling bit in its time slot, means for delivering a standby signal if the station has not received any calling bit, and means for delivering a reception timing pulse signal from the time slot of a calling station to activate the receive memory addressing means and to authorize writing in the receive memory.

4. A system according to claim 1, wherein the connection module further comprises a watchdog timer which delivers a signal to disable the output circuit when the transmission time exceeds a predetermined period, corresponding to the maximum number of frames that a message may comprise.

* * * * *